United States Patent
Denard

(10) Patent No.: US 9,804,595 B1
(45) Date of Patent: Oct. 31, 2017

(54) CONTROL SYSTEM FOR COMMUNICATING WITH AND CONTROLLING OPERATIONS OF A VEHICLE

(71) Applicant: Samuel E. Denard, Houston, TX (US)

(72) Inventor: Samuel E. Denard, Houston, TX (US)

( * ) Notice: Subject to any disclaimer, the term of this patent is extended or adjusted under 35 U.S.C. 154(b) by 2 days.

(21) Appl. No.: 15/162,476

(22) Filed: May 23, 2016

Related U.S. Application Data

(60) Provisional application No. 62/182,185, filed on Jun. 19, 2015.

(51) Int. Cl.
| | | |
|---|---|---|
| *G05D 1/00* | (2006.01) | |
| *B64C 39/02* | (2006.01) | |
| *A63H 27/00* | (2006.01) | |
| *A63H 30/04* | (2006.01) | |

(52) U.S. Cl.
CPC .......... *G05D 1/0016* (2013.01); *A63H 27/02* (2013.01); *A63H 30/04* (2013.01); *B64C 39/024* (2013.01); *B64C 2201/146* (2013.01)

(58) Field of Classification Search
CPC .... G05D 1/0016; G05D 1/0022; A63H 27/02; A63H 30/04; B64C 27/08; B64C 36/024; B64C 2201/146
USPC .............................................................. 701/2
See application file for complete search history.

(56) References Cited

U.S. PATENT DOCUMENTS

| | | | | |
|---|---|---|---|---|
| 2002/0104921 A1* | 8/2002 | Louvel | ................... | A63H 27/04 244/12.1 |
| 2006/0224280 A1* | 10/2006 | Flanigan | ................ | A63H 30/04 701/2 |
| 2008/0063400 A1* | 3/2008 | Hudson | ................... | A63H 30/04 398/106 |
| 2008/0223993 A1* | 9/2008 | Spirov | ..................... | B60V 1/06 244/23 A |
| 2011/0005369 A1* | 1/2011 | Kamimura | ............... | G10C 3/12 84/423 R |
| 2011/0106339 A1* | 5/2011 | Phillips | ................. | G05D 1/0033 701/2 |
| 2011/0221692 A1* | 9/2011 | Seydoux | ................ | A63H 27/12 345/173 |
| 2012/0266358 A1* | 10/2012 | Yuen | ..................... | A61B 5/7475 2/162 |
| 2012/0287284 A1* | 11/2012 | Jacobsen | ................. | G06F 1/163 348/158 |
| 2014/0125577 A1* | 5/2014 | Hoang | .................... | G06F 3/017 345/156 |
| 2016/0304181 A1* | 10/2016 | Steven | ................... | B63H 25/02 |

(Continued)

*Primary Examiner* — Shardul Patel
(74) *Attorney, Agent, or Firm* — Buskop Law Group, P.C.; Wendy Buskop

(57) ABSTRACT

A control system for a vehicle using a primary three axis orientation sensor and a reference three axis orientation sensor spaced apart from the primary sensor. At least one auxiliary control can be used for thrust. A wearable processor can be configured to receive the primary sensor signal and the reference sensor signal. The reference sensor signal can use a conditioning formula and the wearable processor can filter the conditioned signals using a Kalman filter. The filtered signals can form merged signals and apply operator configurations on wrist reference locations to the merged signals. Operation commands can use the merged signals to control the vehicle with four channels of control to a transmitter that communicates with the vehicle.

16 Claims, 3 Drawing Sheets

(56) References Cited

U.S. PATENT DOCUMENTS

2017/0010622 A1\* 1/2017 Pedersen .................. B60V 1/06
2017/0031446 A1\* 2/2017 Clark .................... G05D 1/0016

\* cited by examiner

CONTROL SYSTEM FOR COMMUNICATING WITH AND CONTROLLING OPERATIONS OF A VEHICLE

CROSS REFERENCE TO RELATED APPLICATION

The current application claims priority to and the benefit of U.S. Provisional Patent Application Ser. No. 62/182,185 filed on Jun. 19, 2015, entitled "CONTROL SYSTEM FOR COMMUNICATING WITH AND CONTROLLING OPERATIONS OF A VEHICLE". This reference is hereby incorporated in its entirety.

FIELD

The present embodiments generally relate to a control system for communicating with and controlling operation of an unmanned vehicle.

BACKGROUND

A need exists for a wearable zero force device that can operate a moving vehicle like a model aircraft. The wearable zero force device can have four channels of control. Three of the channels can control pitch, roll, and yaw by the wrist movement of an operator. A fourth channel can control acceleration and deceleration, which can be operated by the finger movement of the operator.

A further need exists for easy operation of remote vehicles by handicapped individuals and the elderly to improve their quality of life.

The present embodiments meet these needs.

BRIEF DESCRIPTION OF THE DRAWINGS

The detailed description will be better understood in conjunction with the accompanying drawings as follows.

Figure 1:
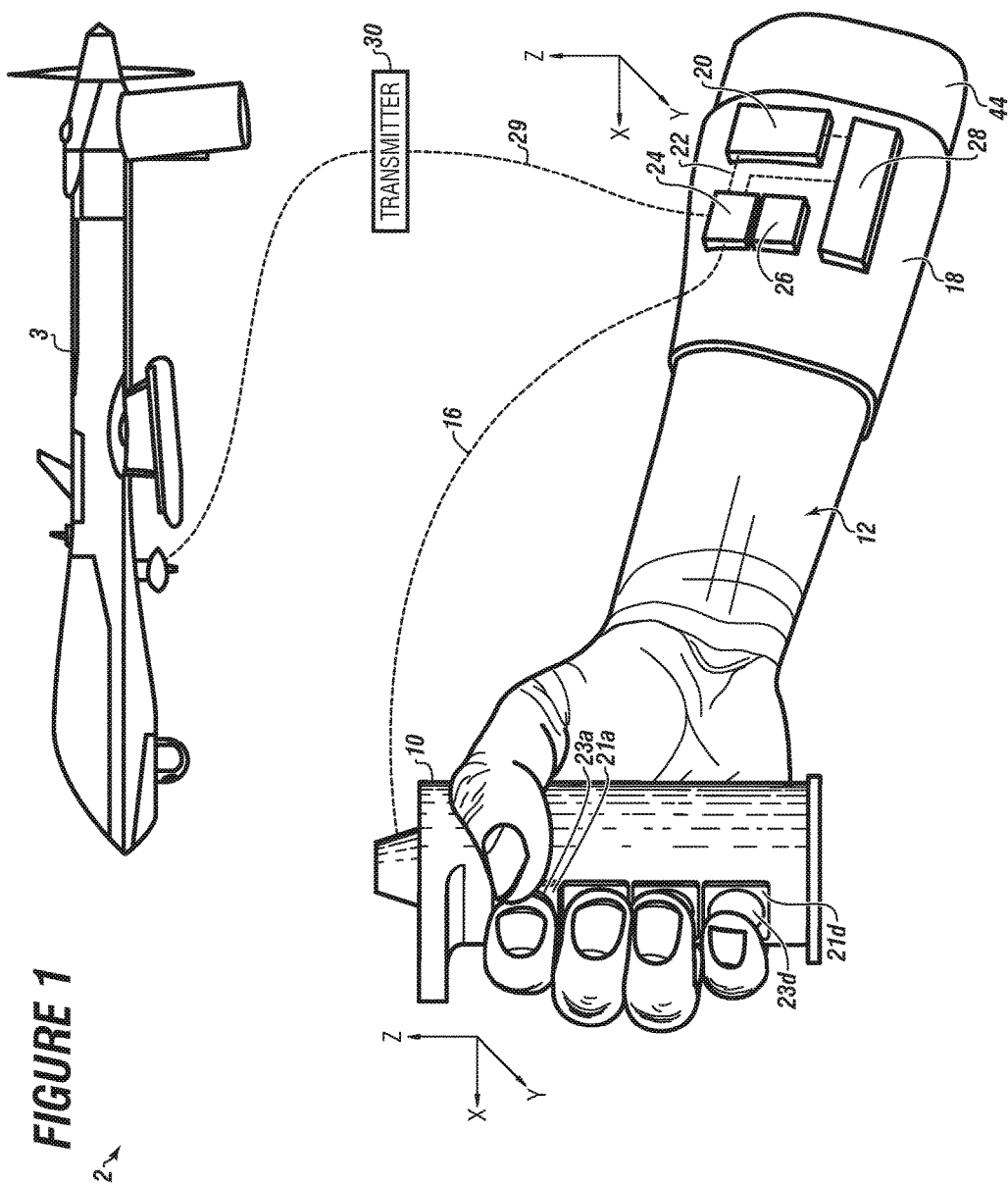
FIG. 1 depicts an overview of the control system according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a control system for communicating with and controlling operation of a vehicle.

The embodiments can further relate to a control system for a vehicle that moves in three dimensions with four channels of control.

The control system can have a hand-supported mounting system with a three axis orientation sensor.

The control system can have a second mounting system with the three axis orientation sensor.

At least one auxiliary control can be used for thrust of the vehicle.

A wearable processor with a data storage and a power supply can be mounted to the second mounting system.

In embodiments, the wearable processor can be configured to receive a primary sensor signal and a reference sensor signal. In embodiments, the primary sensor signal and the reference sensor signal can be received simultaneously by the wearable processor.

In embodiments, the wearable processor can condition the primary sensor signal and the reference signal using a conditioning formula forming a conditioned signal.

In embodiments, the wearable processor can filter conditioned signals using a linear quadratic estimation filter Kalman filter forming filtered signals.

The term "Kalman filter" as used herein can refer to an algorithm that uses a series of measurements observed over time, containing noise (random variations) and other inaccuracies, and produces estimates of unknown variables that tend to be more precise than those based on a single measurement alone. More formally, the Kalman filter operates recursively on streams of noisy input data to produce a statistically optimal estimate of the underlying system state. The Kalman filter can also be known as a linear quadratic estimation filter.

In embodiments, the wearable processor can merge the filtered signals forming merged signals.

In embodiments, the wearable processor can apply operator configurations on wrist reference locations to the merged signals.

In embodiments, the wearable processor can apply vehicle customization to the merged signals.

In embodiments, the wearable processor can generate operation commands using the merged signals to control the vehicle with four channels of control.

A transmitter can be used for transferring the commands from the wearable processor to the vehicle.

The control system can be configured to provide zero force control of pitch, roll, and yaw of the vehicle solely using the wrist of the operator. Simultaneously, the operator's fingers can be used to control thrust for the vehicle.

A benefit of the control system can be that the control system provides command of the vehicle that moves via intuitive hand motions.

The control system can use two solid state sensors. In embodiments, the control system can replace joysticks that have many small mechanical parts that must be assembled and maintained. In further embodiments, the control system can be an effective and lower cost alternative to joysticks.

The control system can eliminate control couplings between throttle and rudder commands for flying vehicles typical of a conventional remote control for model aircraft and other self-propelled vehicles.

The control system can provide an intuitive operation system of control which can make model vehicle control accessible to the handicapped and elderly who need easy to operate but still exciting hobbies.

The control system minimizes operator training requirements. By avoiding the need for specialized training, the overall operation of the control system can be cheaper and easier to use.

The control system can be very light weight, such as less than 12 ounces. The light weight control system can be unobtrusively worn. In embodiments, the control system can have a combined weight from 8 ounces to 16 ounces.

In embodiments, the control system can be built into the operator's uniform or operator's suit, such as a space suit. In embodiments, the transmitter can be positioned on the operator's body.

A benefit of the control system can be that mountings containing the sensors can be housings that can be "hardened" or made waterproof and sealed to operate in harsh, corrosive or otherwise extreme environments, such as underwater.

The control system can allow the operator to stay visually focused on and otherwise engaged with the vehicle rather than the controller itself. This control system can make a good choice for virtual reality environments, such as an operator wearing a virtual reality helmet, glasses, or the like.

The control system can be programmed to provide additional and alternative functionality to meet evolving usage requirements.

The control system can be designed to operate seamlessly with existing commercial model aircraft transmitters.

The control system can be used to improve the ability of disabled people to control and interface with their hobbies.

Another benefit of the control system can be that the controller provides an intuitive method for controlling model aircraft or similar vehicles, which are self-propelled and untethered.

Another benefit of the control system can be that it can provide two solid state sensors which can operate as an alternative to joystick operations to fly the vehicle with more precise operation if the vehicle is being used for search and rescue operations.

Turning now to the Figures, FIG. 1 depicts an overview of the control system according to one or more embodiments.

A control system 2 can communicate with and control operation of a vehicle 3.

The control system 2 can have a hand supported mounting system 10 for controlling the vehicle's movement in three dimensions with wrist motion.

A fourth channel of control can also be on the hand supported mounting system 10 for controlling vehicle thrust, which causes acceleration and deceleration.

The hand supported mounting system 10 can be held in a hand of an operator 12.

Figure 2:
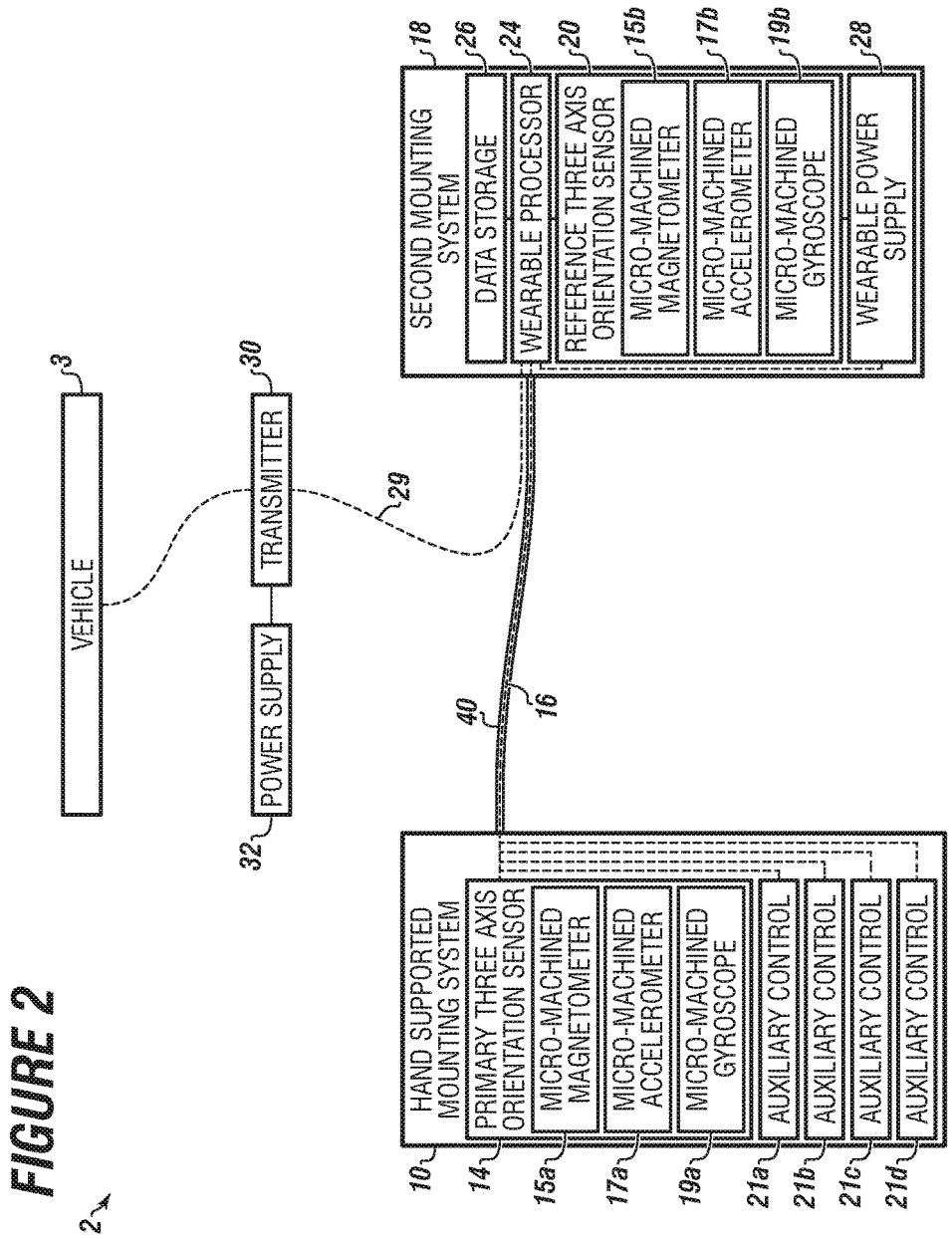
FIG. 2 depicts a block diagram of the control system according to one or more embodiments.

A primary three axis orientation sensor, which is shown in FIG. 2, can be embedded within the hand supported mounting system 10. The primary three axis orientation sensor can generate a primary sensor signal 16.

The primary sensor signal 16 can indicate wrist angles of the operator 12 in three axis x, y, and z.

The control system 2 can include a second mounting system 18, which in embodiments, can be secured to the operator 12 and spaced apart from the hand supported mounting system 10.

A reference three axis orientation sensor 20 can be mounted to the second mounting system 18.

The reference three axis orientation sensor 20 can generate a reference sensor signal 22.

The reference sensor signal 22 can indicate body motion other than wrist motion of the operator in three axis x, y and z.

At least one auxiliary control 21a-21d can be mounted to the hand supported mounting system 10, and in embodiments, can be configured for finger operation by the operator 12.

In embodiments, the at least one auxiliary control 21a-21bd can contain at least one finger contact 23a-23d. In this embodiment, a finger contact 23a is shown, which can increase and decrease thrust of the vehicle 3 and a finger contact 23d can be used to control reverse and forward motion.

A wearable processor 24 can have a data storage 26 mounted to the second mounting system 18. In embodiments, the wearable processor 24 can be a microcomputer.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

A wearable power supply 28 can be mounted to the second mounting system 18 and can be in electrical connection with the wearable processor 24. In embodiments, the control system 2 can be a 5 volt system which uses from a 6 volt to a 12 volt DC battery. In embodiments, the wearable power supply 28 can be solar powered or otherwise rechargeable.

The wearable processor 24 can be configured to receive filtered signals, such as the primary sensor signal 16 and the reference sensor signal 22 and merge the primary sensor signal 16 and the reference sensor signal 22 forming merged signals.

The wearable processor 24 can be configured to generate operation commands 29 using the filtered signals to control the vehicle 3 with four channels of control.

A transmitter 30 can be in communication with the wearable processor 24 to receive the operation commands 29 and transfer the operation commands 29 to the vehicle 3.

In embodiments, the second mounting system 18 can be secured to a forearm 44 of the operator 12.

The control system 2 can be configured to provide simultaneously, resistance free, which is zero force, three channel control of a vehicle, which includes orientation of pitch, roll, and yaw solely using the wrist of the operator. A fourth channel of control for thrust is provided using the fingers of the operator.

FIG. 2 is a block diagram of the control system according to one or more embodiments.

The hand supported mounting system 10 can have a primary three axis orientation sensor 14 made up of a micro-machined magnetometer 15a, a micro-machined accelerometer 17a, and a micro-machined gyroscope 19a.

The primary three axis orientation sensor 14 can be used to exclusively measure wrist angles of the operator in three dimensions.

The hand supported mounting system 10 can support the at least one auxiliary control 21a-21d.

The at least one auxiliary control 21a-21d can control thrust of the vehicle 3.

In embodiments, the at least one auxiliary control 21a can accelerate the vehicle 3 and the at least one auxiliary control 21b can decelerate the vehicle.

In embodiments, the at least one auxiliary control 21c can control reverse motion of the vehicle 3 and the at least one auxiliary control 21d can control forward motion of the vehicle 3.

In further embodiments, additional auxiliary controls can be used as on/off switches of the vehicle 3.

In embodiments, the at least one auxiliary control 21a-21d can be finger operated buttons to provide throttle up, throttle down, power on, and power off. In further embodiments, the at least one auxiliary control can operate deployment of landing gear.

In embodiments, the at least one auxiliary control 21a-21d can be potentiometers with linear and rotational sensing and persistent feedback to the operator.

The control system 2 can have a cable 40 connecting the primary three axis orientation sensor 14 and the wearable processor 24 for transmitting the primary sensor signal 16.

The wearable processor 24 can transmit operation commands 29 to the transmitter 30.

In embodiments, the transmitter 30 can have a power supply 32. The transmitter 30 can transmit the operation commands 29 to the vehicle 3.

The power supply 32 can provide electrical power to the transmitter 30. In embodiments, the power supply can be a fuel cell, a battery, or another energy source.

In embodiments, the control system 2 can have a wireless connection between the primary three axis orientation sensor 14, the reference three axis orientation sensor 20, the wearable processor 24, and the transmitter 30.

In embodiments, the primary three axis orientation sensor 14, the reference three axis orientation sensor 20, and the at least one auxiliary control 21a-21d can be mechatronic devices.

In embodiments, the vehicle 3 can be an aircraft, a boat, a helicopter, a submarine, or any remotely operated vehicle.

The second mounting system 18 can include the wearable processor 24 with the data storage 26 connected to the wearable power supply 28, and the reference three axis orientation sensor 20.

The reference three axis orientation sensor 20 can have a micro-machined magnetometer 15b, a micro-machined accelerometer 17b, and a micro-machined gyroscope 19b.

Figure 3:
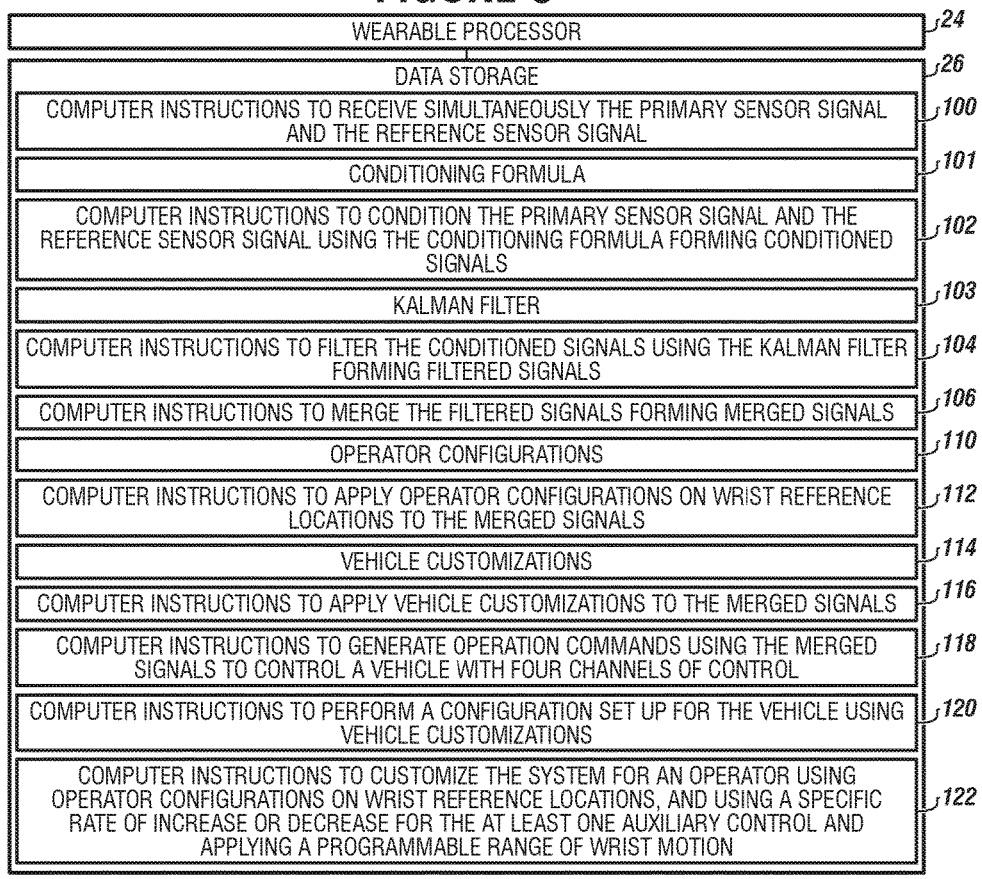
FIG. 3 depicts a diagram of data storage of a wearable processor according to one or more embodiments.

FIG. 3 depicts a diagram of the data storage of the wearable processor according to one or more embodiments.

The data storage 26 of the wearable processor 24 can contain computer instructions 100 to receive simultaneously the primary sensor signal and the reference sensor signal.

The data storage 26 can contain a conditioning formula 101 for converting electrical voltage to application units, like degrees or radians, using the received primary sensor signal and the received reference sensor signal.

The data storage 26 can contain computer instructions 102 to condition the primary sensor signal and the reference sensor signal using the conditioning formula forming conditioned signals.

The data storage 26 can contain a Kalman filter 103.

The data storage 26 can contain computer instructions 104 to filter the conditioned signals using the Kalman filter forming filtered signals.

The data storage 26 can contain computer instructions 106 to merge the filtered signals forming merged signals.

The data storage 26 can contain operator configurations 110. In embodiments, the operator configurations can include wrist reference locations.

The data storage 26 can contain computer instructions 112 to apply operator configurations on wrist reference locations to the merged signals.

The data storage 26 can contain vehicle customizations 114.

The data storage 26 can contain computer instructions 116 to apply vehicle customizations to the merged signals.

The data storage 26 can contain computer instructions 118 to generate operation commands using the merged signals to control a vehicle with four channels of control. The operation commands can indicate pitch, roll, and yaw for the vehicle.

The data storage 26 can contain computer instructions 120 to perform a configuration set up for the vehicle using vehicle customizations.

The data storage 26 can contain computer instructions 122 to customize the system for an operator using operator configurations on wrist reference locations, and using a specific rate of increase or decrease for the at least one of the auxiliary control and applying a programmable range of wrist motion.

As an example, the programmable range of wrist movement can vary from +/−45 degrees.

In embodiments, a group of operators can use the control system to control a model aircraft.

The operator can take the following steps to use the control system.

The operator can prepare the vehicle and transmitter for operation. The operator can put on the wearable processor and the second mounting system.

The operator can make an electrical connection between the wearable processor and the hand supported mounting system.

The operator can grasp the hand supported mounting system with the primary three axis orientation sensor.

The operator can power up the transmitter.

The operator can apply power to the primary three axis orientation sensor and the reference three axis orientation sensor using the power supply.

The operator can establish communication between the wearable processor and the transmitter.

The operator can activate the transmitter to enable communication between the vehicle and the wearable processor.

The operator can move the hand supported mounting system using wrist motions. In embodiments, the operator can calibrate the wrist angles and verify correct operation.

In embodiments, after calibration, the operator can then fly the model aircraft or unmanned vehicle using only wrist motions and using the operator's fingers gripping the hand supported mounting system.

In embodiments, the control system can provide two sensors. A first sensor can provide a primary orientation for the vehicle and a second sensor can provide a reference orientation for the vehicle. In further embodiment, throttle buttons can be built into the hand supported mounting system to increase and decrease vehicle speed.

The first sensor can communicate with the wearable processor to condition and filter the primary three axis orientation sensor signals provided by the first sensor. The first sensor can provide information from the micro-machined magnetometer, the micro-machined accelerometer, and the micro-machined gyroscope.

The second sensor can communicate with the wearable processor to condition and filter the reference three axis orientation sensor signals provided from the second sensor. The second sensor can provide information from the micro-machined magnetometer, the micro-machined accelerometer, and the micro-machined gyroscope.

The wearable processor can generate commands and provide an interface to a conventional transmitter/controller of the vehicle without human need to touch the conventional transmitter/controller and thereby control the model aircraft or unmanned vehicle.

In embodiments, the wearable processor can be an ARDUINO™ processor with interrupt service routine software architecture for conditions and filters.

In embodiments, the control system can relate more specifically for communicating with and controlling operation of at least pointing device.

In embodiments, the hand supported mounting system can move around a pivot axis by the wrist of the operator in three axes without resistance.

In embodiments, the hand supported mounting system can be cylindrical for grasping between the thumb and the fingers.

In embodiments, the first sensor can be configured to measure a hand's angular position.

An exemplary first sensor is an ADAFRUIT® 9-DOF IMU breakout board with STMicroelectronics, model numbers L3GD20H and LSM303.

In embodiments, the wearable processor can filter signals from the first sensor and second sensor using operator preset limits stored in the data storage forming conditioned signals.

In embodiments, the operator preset limits can be a data measurement error that can provide an accuracy specification.

In embodiments, the wearable processor can perform two functions simultaneously, namely signal conditioning and signal filtering.

In embodiments, the transmitter can supply commands to the vehicle after receiving the conditioned signals wirelessly.

While these embodiments have been described with emphasis on the embodiments, it should be understood that within the scope of the appended claims, the embodiments might be practiced other than as specifically described herein.

What is claimed is:

1. A control system for communicating with and controlling operations of a vehicle that moves in three dimensions with four channels of control, the control system comprising:
   a) a hand supported mounting system;
   b) a primary three axis orientation sensor embedded within the hand supported mounting system generating a primary sensor signal;
   c) a second mounting system spaced apart from the hand supported mounting system;
   d) a reference three axis orientation sensor mounted to the second mounting system; the reference three axis orientation sensor generating a reference sensor signal;
   e) at least one auxiliary control mounted to the hand supported mounting system configured for finger operation by an operator, the at least one auxiliary control controlling thrust of the vehicle;
   f) a wearable processor with a data storage mounted to the second mounting system, the wearable processor configured to:
      (i) receive simultaneously the primary sensor signal and the reference sensor signal;
      (ii) condition the primary sensor signal and the reference sensor signal using a conditioning formula forming conditioned signals;
      (iii) filter the conditioned signals using a Kalman filter forming filtered signals;
      (iv) merge the filtered signals forming merged signals;
      (v) apply operator configurations on wrist reference locations to the merged signals;
      (vi) apply vehicle customizations to the merged signals; and
      (vii) generate operation commands using the merged signals to control the vehicle with four channels of control;
   g) a wearable power supply in electrical connection with the wearable processor; and
   h) a transmitter in communication with the wearable processor for receiving the operation commands and transferring the operation commands to the vehicle; and wherein the control system is configured to provide simultaneously, resistance free three channels of control for orientation of pitch, roll, and yaw solely using a wrist of the operator and a fourth channel of control for thrust using fingers of the operator.

2. The control system of claim 1, wherein the transmitter further includes a power supply for providing electrical power to the transmitter.

3. The control system of claim 1, further comprising a cable interconnected between the primary three axis orientation sensor and the wearable processor.

4. The control system of claim 1, further comprising a wireless connection between the primary three axis orientation sensor, the reference three axis orientation sensor, the wearable processor, and the transmitter.

5. The control system of claim 1, wherein the at least on auxiliary control are finger operated buttons to provide throttle up, throttle down, power on and power off.

6. The control system of claim 1, wherein the primary three axis orientation sensor, the reference three axis orientation sensor, and the at least one auxiliary control are mechatronic devices.

7. The control system of claim 1, wherein the vehicle is an aircraft, a boat, a helicopter, a submarine, or another remotely operated vehicle.

8. The control system of claim 1, wherein the primary three axis orientation sensor comprises a micro-machined magnetometer, a micro-machined accelerometer; and a micro-machined gyroscope, and wherein the primary three axis orientation sensor configured to exclusively measure wrist angles of the operator in three dimensions.

9. The control system of claim 1, wherein the reference three axis orientation sensor comprises a micro-machined magnetometer, a micro-machined accelerometer, and a micro-machined gyroscope, wherein the reference three axis orientation sensor is configured to measure wrist angles generated by operator movement other than wrist motion of a hand of the operator.

10. The control system of claim 1, wherein the at least one auxiliary control has at least one finger contact for increasing and decreasing thrust of the vehicle.

11. The control system of claim 1, wherein the at least one auxiliary control has at least one finger contact to control reverse and forward motion.

12. The control system of claim 1, wherein the second mounting system is secured to a forearm of the operator and the hand supported mounting system is held by a hand of the operator.

13. The control system of claim 1, wherein the data storage comprises:
   a) computer instructions to instruct the wearable processor to receive simultaneously the primary sensor signal and the reference sensor signal;
   b) the conditioning formula for removing noise from the merged signals;
   c) computer instructions to instruct the wearable processor to condition the primary sensor signal and the reference sensor signal using the conditioning formula forming the conditioned signals;
   d) the Kalman filter;
   e) computer instructions to instruct the wearable processor to filter the conditioned signals using the Kalman filter forming the filtered signals;
   f) computer instructions to instruct the wearable processor to merge the filtered signals forming the merged signals;

g) the operator configurations on the wrist reference locations to the conditioned signals;
h) computer instructions to instruct the wearable processor to apply the operator configurations on the wrist reference locations to the merged signals;
i) the vehicle customizations;
j) computer instructions to instruct the wearable processor to apply the vehicle customizations to the merged signals; and
k) computer instructions to instruct the wearable processor to generate the operation commands using the merged signals to control the vehicle with four channels of control.

14. The control system of claim 13, wherein the data storage further comprises computer instructions to instruct the wearable processor to perform a configuration set up for the vehicle using the vehicle customizations.

15. The control system of claim 13, wherein the data storage further comprises computer instructions to instruct the wearable processor to customize the control system for the operator using the operator configurations on the wrist reference locations, and using a specific rate of increase or decrease for the at least one auxiliary control and applying a programmable range of wrist motion.

16. The control system of claim 15, wherein the programmable range of wrist movement varies from +/−45 degrees.

* * * * *